United States Patent
Chen et al.

(10) Patent No.: US 7,493,261 B2
(45) Date of Patent: Feb. 17, 2009

(54) TRAVEL MANAGEMENT SYSTEM UTILIZING MULTIPLE COMPUTER RESERVATION SYSTEMS (CRSS)

(75) Inventors: Jerome Chen, Fremont, CA (US); Robert Jay GaBany, San Jose, CA (US); Narendra Goyal, Campbell, CA (US)

(73) Assignee: GetThere L.P., Southlake, TX (US)

( * ) Notice: Subject to any disclaimer, the term of this patent is extended or adjusted under 35 U.S.C. 154(b) by 1626 days.

(21) Appl. No.: 09/834,156

(22) Filed: Apr. 12, 2001

(65) Prior Publication Data

US 2002/0152100 A1    Oct. 17, 2002

(51) Int. Cl.
*G06Q 10/00* (2006.01)
(52) U.S. Cl. .............................................. 705/1; 705/5
(58) Field of Classification Search ................ 705/1, 705/5
See application file for complete search history.

(56) References Cited

U.S. PATENT DOCUMENTS 5,832,451 A * 11/1998 Flake et al. .................... 705/5
5,832,454 A * 11/1998 Jafri et al. ..................... 705/6

OTHER PUBLICATIONS

Rosen et al., Transforming Travel, Jun. 26, 2000, InformationWeek, Issue 792, p. 50.*

* cited by examiner

*Primary Examiner*—Janice A Mooneyham
*Assistant Examiner*—Fonya Long
(74) *Attorney, Agent, or Firm*—Alston & Bird LLP

(57) ABSTRACT

A system and method for travel management that utilizes multiple computer reservation systems (CRSs) for making travel related bookings. In one embodiment, a server provides access to a plurality of computer reservation systems (CRSs) for a client initiating a travel booking request. The client can book a travel item segment from any one of the accessible CRSs. CRSs for particular travel item segments are predefined for the client, along with particular conditions, prior to a travel booking request. The predefined CRSs are accessed to check the availability of travel items. The available travel items are displayed to the client for booking. When the client books a travel item, the booked travel item segment is stored in a super passenger name record (PNR). In some embodiments, the super PNR includes a CRS designation associated with each travel item segment.

6 Claims, 8 Drawing Sheets

Terminal Access Editor (TAE) Data 500

| Request Type: All, Air avail, Car avail, Hotel avail, Low fare search 502 | Group Type: Primary or Secondary 504 ||
|---|---|---|
| Default CRS / GDS and Associated Vendor(s) (e.g. air, car, hotel) 506 | Default TA Group 508 | Condition 524 |
| Primary CRS / GDS and Associated Vendor(s) (e.g. air, car, hotel) 510 | Primary TA Group 512 | Condition |
| Secondary$_1$ CRS / GDS and Associated Vendor(s) (e.g. air, car, hotel) 514 | Secondary$_1$ TA Group 516 | Vendor 528 |
| ⋮ | ⋮ | |
| Secondary$_n$ CRS / GDS and Associated Vendor(s) (e.g. air, car, hotel) 518 | Secondary$_n$ TA Group 520 | Vendor |
| | ⋮ | Other Information |

FIG. 5

| | | | | | | |
|---|---|---|---|---|---|---|
| PNR Data 802 | Name 804 | Address 806 | Telephone Numbers 808 | Employer 810 | PNR Record Locator 811 | ... Other Standard PNR Data |
| Air₁ 820 | Name of Airline 822 | Date and Time of Flight 824 | (Super PNR) CRS 826 | (Super PNR) TA Group 828 | (Super PNR) CRS Locator 829 | ... Other Standard PNR Data |
| Car 830 | Name of Car Rental Company 832 | Day(s) of Car Rental 834 | (Super PNR) CRS 836 | (Super PNR) TA Group 838 | (Super PNR) CRS Locator 839 | ... Other Standard PNR Data |
| Hotel 840 | Name of Hotel 842 | Day(s) of Hotel Stay 844 | (Super PNR) CRS 846 | (Super PNR) TA Group 848 | (Super PNR) CRS Locator 849 | ... Other Standard PNR Data |
| | | | | | | ... Other Standard PNR Data |

Super PNR Data 800

FIG. 8

TRAVEL MANAGEMENT SYSTEM UTILIZING MULTIPLE COMPUTER RESERVATION SYSTEMS (CRSS)

BACKGROUND

1. Field of the Invention

This invention relates to travel management systems. In particular, the invention relates to a travel management system that utilizes multiple computer reservation systems (CRSs).

2. Description of Related Art

Market forces are driving on-line service providers of point-to-point travel reservation services to expand support beyond dependence on predominant computer reservation systems (CRSs), particularly global distribution systems (GDSs), as the only source of availability, pricing, and booking capabilities. The term CRS generally denotes GDSs and direct connect CRSs. A GDS is a set of internally networked databases, and the business logic that ties them together, for the primary purpose of managing the sale of airline, car rental, and hotel inventories. Today's GDSs include APOLLO, SABRE, WORLDSPAN, AMADEUS, and many others. A GDS is connected to a number of independent CRSs with which the GDS has a business relationship. For example, a GDS may be connected to a CRS for airline travel items (e.g. SOUTHWEST AIRLINES), a CRS for rental car travel items (e.g. HERTZ), and a CRS for hotel travel items (e.g. HOLIDAY INN). Moreover, many CRSs can now be connected to directly, to make reservations (often termed bookings) without going through a GDS, and are thus termed direct connect CRSs such as, for example: a direct connect CRS for airline reservations (e.g. CONTINENTAL AIRLINES), a direct connect CRS for car reservations (e.g. ALLIED), a direct connect CRS for hotel reservations (e.g. RAMADA), etc.

Fundamentally, on-line service providers of travel reservation services offer a user-friendly interface to the same CRS functionality used by most modern travel agencies. Most on-line travel service providers, like travel agencies, utilize a single GDS for their travel bookings. The on-line systems perform four basic functions by:

1. Translating user requests for information into the language of the CRS,
2. Transmitting the request,
3. Receiving the CRS response, and
4. Interpreting the CRS response back into a recognizable display for the user.

Travel agencies store individual travel booking records in database records called passenger name records (PNRs). These records store the customer's personal information and individual reservation summaries for each airline reservation segment, car rental segment, and hotel segment contained in the booking. The summaries include a reference to the actual location of the inventory held by the segment. The segment source can be located in another part of the GDS or externally at another system on the network. The PNR establishes and maintains the relationship of the segments to each other to form a single integrated trip, or booking record. Business logic built into the GDS manages the individual PNR travel item segments to ensure that a booking change to one or more segments results in an update to every segment.

Much of the functionality exhibited by the PNR used by travel agencies has been duplicated by on-line travel service providers, such that today's on-line travel service providers offer many of the same advantages of using a travel agency. Furthermore, on-line travel service providers provide advantages above and beyond the traditional travel agency by ease-of-use, e.g., the client can simply log on to the on-line travel service provider's web site to quickly and easily make travel reservations without having to deal with a travel agency.

Unfortunately, both travel agencies and today's on-line travel service providers are very limited in that they only deal with one CRS, typically a GDS (e.g. APOLLO or SABRE), for all their travel items (e.g. air, car, hotel). Thus, clients of the travel agency or on-line travel service provider are limited to the particular vendors used by the particular GDS. Accordingly, clients often cannot get the best available travel item, or the best available price on the travel item, and are offered very limited choices, or no choices at all. For example, an on-line service provider may use a GDS that only utilizes the vendor UNITED AIRLINES for airline reservations. Unfortunately, SOUTHWEST AIRLINES (e.g. which is only available thru another GDS) may have a better price and a better departure and arrival time for the client. Thus, today's on-line service providers and travel agencies typically only deal with one CRS (e.g. a GDS) and do not give clients a selection of travel items from different CRSs such that the client can choose the best travel items to suit their needs.

SUMMARY OF THE INVENTION

The present invention relates to travel management systems. In particular, the invention relates to a system and method for travel management that utilizes multiple computer reservation systems (CRSs) for making travel related bookings.

In one embodiment, a server provides access to a plurality of computer reservation systems (CRSs) for a client initiating a travel reservation or booking request. CRSs generally denote global distribution systems (GDSs) and direct connect CRSs. The client can book a travel item segment from any one of the accessible CRSs. A travel item segment can be an air segment, a car segment, a hotel segment, or other types of useful segments related to travel. CRSs for particular travel item segments are predefined for the client, along with particular conditions, prior to a travel booking request. The predefined CRSs are accessed to check the availability of travel items. The available travel items are displayed to the client for booking. When the client books a travel item, the booked travel item segment is stored in a super passenger name record (PNR). In some embodiments, the super PNR includes a CRS designation (e.g. the name of the CRS or the CRS locator) associated with each travel item segment. The super PNR can then be accessed by the client for modification. In some embodiments, the system and method for travel management utilizing multiple computer reservation systems (CRSs) for making travel related bookings can be Internet based.

Thus, a client of the travel management system (TMS) of the invention can transparently make travel bookings using more than one CRS (GDSs and direct connect CRSs) for different travel item segments (e.g. air, car, and hotel) to thereby choose the best travel item to suit their needs. This sort of booking, even though it uses multiple CRSs, is indistinguishable from a regular booking using a standard GDS. Moreover, the client (e.g. an individual user or travel agency) can utilize the TMS of the invention to create, change, or cancel booked travel item segments, even though they are through different CRSs, all at one location—e.g. at the server implementing the TMS via a Web-site interface.

BRIEF DESCRIPTION OF THE DRAWINGS

The features and advantages of the present invention will become apparent from the following description of the present invention in which:

FIG. 2a illustrates a conventional data processing system useable with embodiments of the present invention.

FIG. 2b illustrates a typical architecture of the conventional data processing system shown in FIG. 2a.

FIG. 5 illustrates data used by a terminal access editor (TAE) according to one embodiment of the present invention.

FIG. 8 illustrates data used in a super PNR booking record according to one of embodiment of the present invention.

DETAILED DESCRIPTION

In the following description, the various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, types of data, protocols, procedures, components, networking equipment, processes, interfaces, electrical structures, circuits, etc. are not described in detail, or are shown in block diagram form, in order not to obscure the present invention. Furthermore, aspects of the invention will be described in particular embodiments but may be implemented in hardware, software, firmware, middleware, or a combination thereof.

Figure 1:
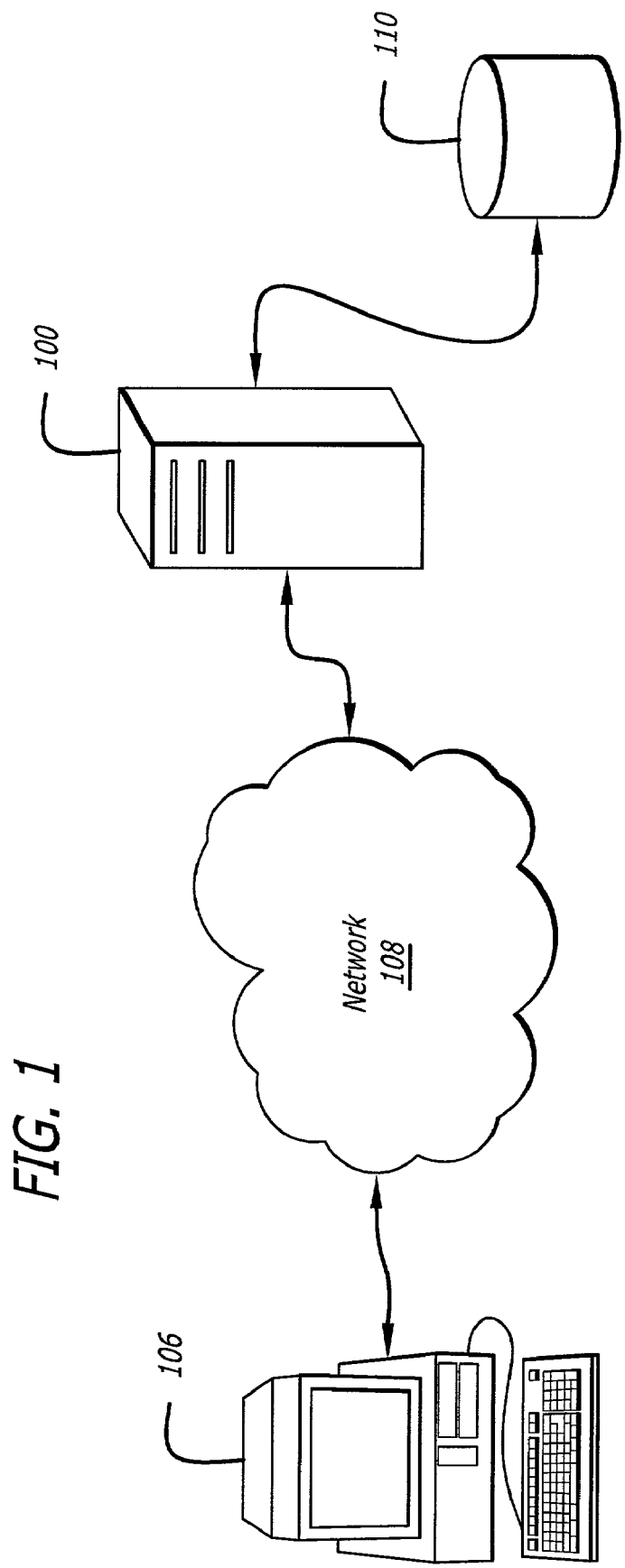
FIG. 1 is a block diagram illustrating an exemplary communications network in which embodiments of the present invention can be practiced.

Referring now to FIG. 1, a block diagram illustrating an exemplary communications network in which embodiments of the present invention can be practiced is shown. According to one embodiment of the present invention the network topology depicted in FIG. 1 includes a server, such as a super passenger name record (PNR) travel management system (TMS) server 100 (to be discussed in detail later) coupled to and in communication with a storage device 110 (e.g. a database) via a database server (not illustrated), as well as with various clients devices 106 via a network 108. It should be appreciated by those having ordinary skill in the network-related arts that client devices 106 and server 100 may be coupled to network 108 in a variety of ways including through direct or dial-up telephone or other network transmission lines, using a modem pool (not illustrated), or through an additional network and gateway (not illustrated). For example, the client devices 106 can communicate with the server 100 via a link utilizing one or more of the plain old telephone system (POTS), a cellular phone system, cable, Digital Subscriber Line, Integrated Services Digital Network, satellite connection, computer network (e.g. a wide area network (WAN), the Internet, or a local area network (LAN), etc.), or generally any sort of private or public telecommunication system, and combinations thereof. Examples of a transport medium for the links include, but are not limited or restricted to electrical wire, optical fiber, cable including twisted pair, or wireless channels (e.g. radio frequency (RF), terrestrial, satellite, or any other wireless signaling methodology).

The network 108 is typically a computer network (e.g. a wide area network (WAN), the Internet, or a local area network (LAN), etc.), which is a packetized or a packet switched network that can utilize Internet Protocol (IP), Asynchronous Transfer Mode (ATM), Frame Relay (FR), Point-to-Point Protocol (PPP), Voice over Internet Protocol (VoIP), or any other sort of data protocol. The network 108 allows the communication of data traffic between the client device 106 and the server 100 using packets. Data traffic through the network 110 may be of any type including text, graphics, video, e-mail, Fax, multi-media, documents, voice, audio, and other generic forms of data. The network 108 is typically a data network that may contain switching or routing equipment designed to transfer digital data traffic. It should be appreciated that the FIG. 1 environment is only exemplary and that embodiments of the present invention can be used with any type of telecommunication system and/or computer network, protocols, and combinations thereof.

In one embodiment of the present invention, super PNR TMS server 100 includes a web server and an application server to provide travel management system functionality to users of the client device 106. For example, using the Hypertext Transfer Protocol (HTTP) and Hypertext Markup Language (HTML) or Extensible Markup Language (XML) code across network 108, super PNR TMS server 100 can communicate with client devices 106 to facilitate this functionality.

Utilizing conventional web browser client applications such as Netscape™ Navigator™ published by Netscape™ Corporation of Mountain View, Calif., the Internet Explorer™ published by Microsoft™ Corporation of Redmond, Wash., the user interface of America Online™, or the web browser or HTML/XML translator of any other well-known supplier, client devices 106 may supply data to, and access processed or unprocessed data from super PNR TMS server 100 and may also run server-provided, Web-based application software. It will be appreciated by those having ordinary skill in the network-related arts that network 108 may be organized as either a wide-area (WAN) or local-area (LAN) network, and may be administered as a private network (an intranet), a public network (the Internet), or a combination of private and public networks (an extranet).

According to one embodiment of the present invention, the information communicated between client devices 106 and super PNR TMS server 100 includes customer travel profiles, corporate travel policies, travel booking information related to airlines, car rentals, hotels, information related to CRSs and GDSs, and other information associated with requesting and booking travel related items for client. This information can be stored within storage device 110. It will be readily appreciated by those having ordinary skill in the relevant arts that storage device 110 may include various mass storage devices such as one or more DASD arrays, tape drives, optical drives, or the like, and that the aforementioned information may be stored in any one of a variety of formats or data structures.

Figures 2A, 2B:
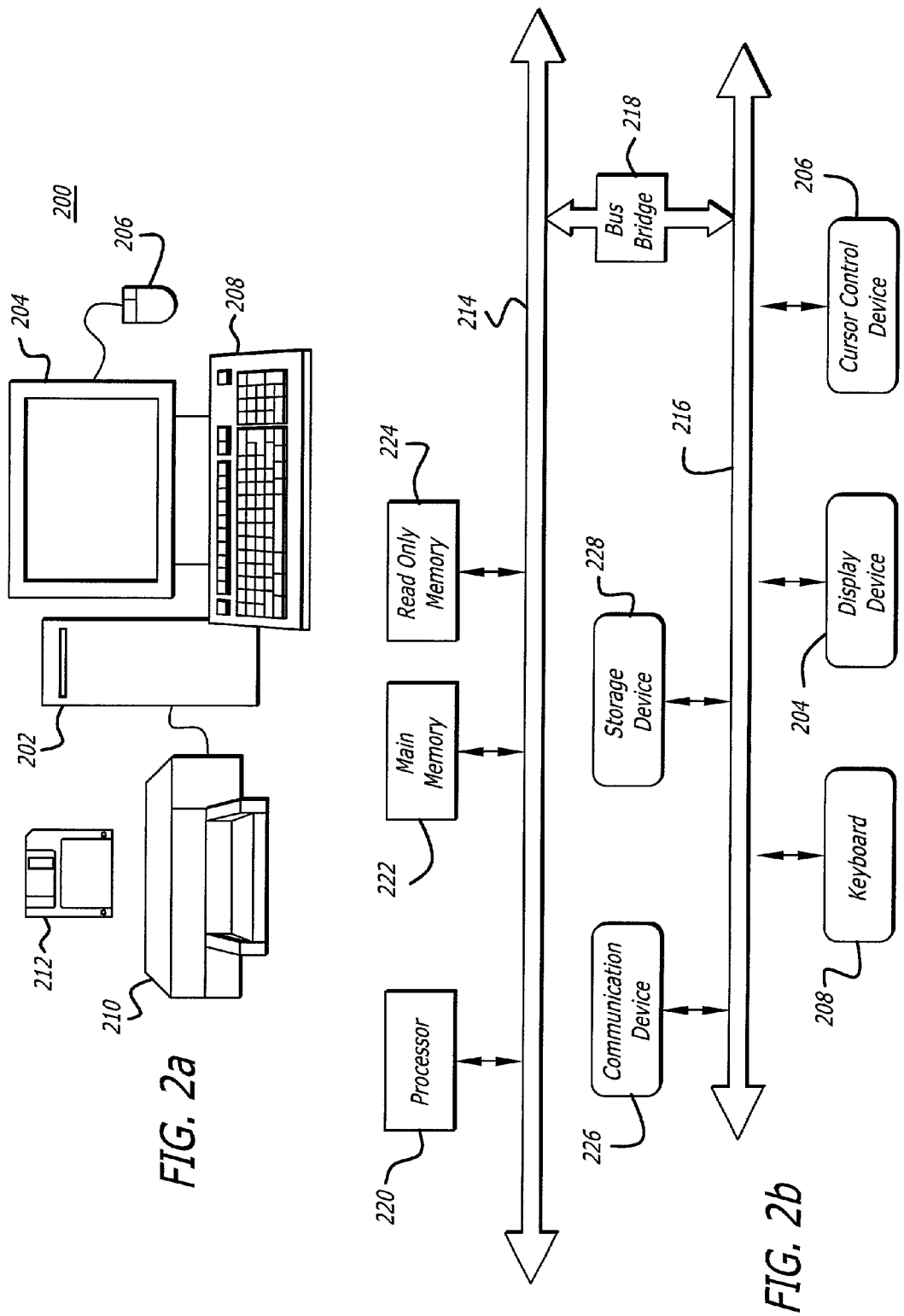

Having briefly described an exemplary network environment in which embodiments of the present invention can be practiced, FIG. 2a illustrates a conventional data processing system useable with embodiments of the present invention. More particularly, FIG. 2a illustrates an example of a data processing system 200 for an exemplary client device (e.g. computer system) or server computer system in which the features of the present invention may be utilized. As illustrated, data processing or computer system 200 is comprised of a system unit 202, output devices such as display device 204 and printer 210, and input devices such as keyboard 208, and mouse 206. Data processing system 200 receives data for processing by the manipulation of input devices 208 and 206 or directly from fixed or removable media storage devices such as disk 212 and network connection interfaces (not illustrated). Data processing system 200 then processes data and presents resulting output data via output devices such as display device 204, printer 210, fixed or removable media storage devices like disk 212 or network connection interfaces. It should be appreciated that the client device 106 can be any sort of computer system (e.g. personal computer (laptop/desktop), network computer, server computer, or any other type of computer).

Referring now to FIG. 2b, there is depicted a high-level block diagram of the components of a data processing system 200 such as that illustrated by FIG. 2a. In a conventional computer system, system unit 202 includes a processing device such as processor 220 in communication with main memory 222 which may include various types of cache, random access memory (RAM), or other high-speed dynamic storage devices via a local or system bus 214 or other communication means for communicating data between such devices. Main memory 222 is capable of storing data as well as instructions to be executed by processor 220 and may be used to store temporary variables or other intermediate information during execution of instructions by processor 220. Computer system 200 also comprises a read only memory (ROM) and/or other static storage devices 224 coupled to local bus 214 for storing static information and instructions for processor 220. System unit 202 of data processing system 200 also features an expansion bus 216 providing communication between various devices and devices attached to the system bus 214 via bus bridge 218. A data storage device 228, such as a magnetic disk 212 or optical disk such as a CD-ROM and its corresponding drive may be coupled to data processing system 200 for storing data and instructions via expansion bus 216. Computer system 200 can also be coupled via expansion bus 216 to a display device 204, such as a cathode ray tube (CRT) or a liquid crystal display (LCD), for displaying data to a computer user such as generated meeting package descriptions and associated images. Typically, an alphanumeric input device 208, including alphanumeric and other keys, is coupled to bus 216 for communicating information and/or command selections to processor 220. Another type of user input device is cursor control device 206, such as a conventional mouse, trackball, or cursor direction keys for communicating direction information and command selection to processor 220 and for controlling cursor movement on display 204.

Alternatively, a client device 106 can be implemented as a network computer or thin client device, such as the WebTV Networks™ Internet terminal or the Oracle™ NC. Client device 106 may also be a laptop or palm-top computing device, such as the Palm Pilot™. Client device 106 could also be implemented in a robust cellular telephone, where such devices are currently being used with Internet micro-browsers. Such a network computer or thin client device does not necessarily include all of the devices and features of the above-described exemplary computer system; however, the functionality of the present invention or a subset thereof may nevertheless be implemented with such devices.

A communication device 226 is also coupled to bus 216 for accessing remote computers or servers, such as server 100, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 100 via a network infrastructure such as that illustrated in FIG. 1 and described above.

Figure 3:
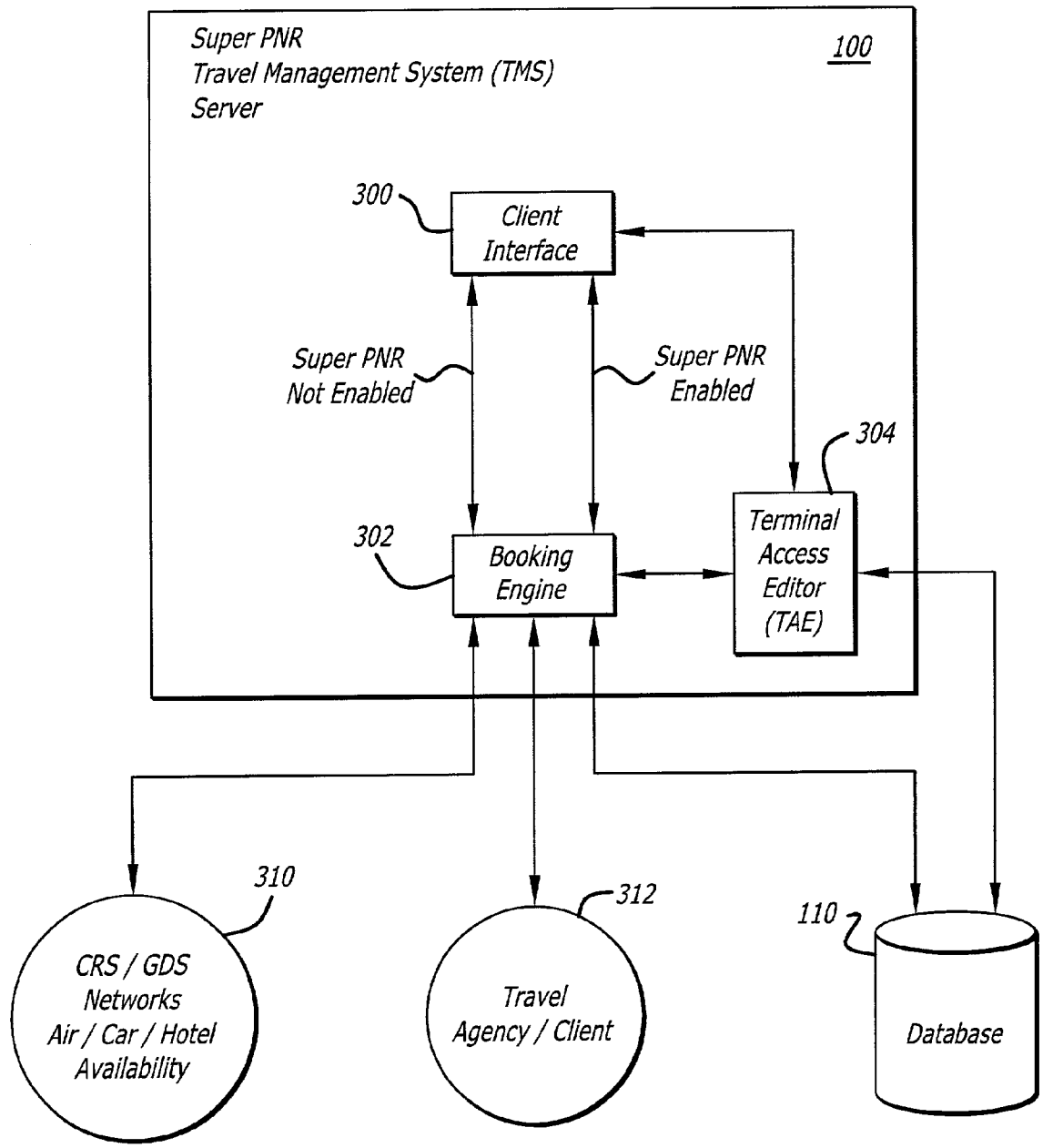
FIG. 3 illustrates a block diagram of a travel management system (TMS) server according to one embodiment of the present invention.

Referring now to FIG. 3, FIG. 3 illustrates a block diagram of a super PNR TMS server 100 according to one embodiment of the present. As shown in FIG. 3, the super PNR TMS server 100 includes a client interface 300, a booking engine 302, and a terminal access editor (TAE) 304. The super PNR TMS server 100 is coupled to a plurality of computer reservation system CRSs 310, including global distribution systems (GDSs) and direct connect CRSs. The super PNR TMS server 100 provides access to the plurality of computer reservation systems (CRSs) 310 for a client initiating a travel booking request. The client can book a travel item segment from any one of the accessible CRSs 310. A travel item segment can be an air segment, a car segment, a hotel segment, or other types of useful segments related to travel. CRSs for particular travel item segments are predefined for the client, along with particular conditions, prior to a travel booking request, utilizing the TAE 304, and are stored in the database 110.

The booking engine 302 reads the database 110 to determine the predefined CRSs for the client and accesses the predefined CRSs from the network of CRSs 310 to check the availability of travel items. The available travel items are displayed via the client interface 300 to the client device for booking. When the client selects a travel item segment for booking, the booking engine 302 books the travel item with the respective CRS, and the booked travel item segment is stored in a super passenger name record (PNR) in the database 110. The super PNR TMS server 100 is coupled to the database 110 for storing and retrieving booking records and predefined CRSs (e.g. client profiles or configurations), etc. In some embodiments, the super PNR includes a CRS designation (e.g. the name of the CRS or the CRS locator) associated with each travel item segment. The super PNR booking record can then be accessed by the client device, via the client interface 300, for modification. Also, in some embodiments, the super PNR TMS server 100 can be coupled to travel agencies and clients 312 (e.g. corporate clients) that fulfill tickets booked through the super PNR TMS server 100.

The client interface 300 functionality of the super PNR TMS server 100 can include utilizing a web server. For example, the web server can function as an interface between the super PNR TMS server 100 and the various client devices 106 by presenting a client interface, for example, via HTML-specific Java Server Pages (JSPs). For example, using the Hypertext Transfer Protocol (HTTP) and Hypertext Markup Language (HTML) or Extensible Markup Language (XML) code across network, the client interface 300 of the super PNR TMS server 100 can facilitate communicate with the client devices. Utilizing conventional web browser client applications such as Netscape™ Navigator™ published by Netscape™ Corporation of Mountain View, Calif., the Internet Explorer™ published by Microsoft™ Corporation of Redmond, Wash., the user interface of America Online™, or the web browser or HTML/XML translator of any other well-known supplier, client devices may supply data to, and access processed or unprocessed data from the super PNR TMS server 100, and may also run server-provided Web-based application software, in order to perform functionality provided by the super PNR TMS server 100.

The client interface 300 utilizing this functionality permits the client to first select whether or not they would like super PNR enabled. Alternatively, Super PNR can be automatically configured for the client. When super PNR is enabled, the client interface 300 allows the client to make travel bookings using the plurality of CRSs 310 for different travel item segments (e.g. air, car, and hotel) such that the client can choose and book the best travel item segment to suit their needs from any one of the accessible CRSs (and many other functions as will be discussed). Also, the client interface 300 displays the super PNR booking record (representing the client's booked itinerary) to allow the client to create, change, or cancel booked travel item segments, even though they are through different CRSs, via the client interface. Thus, a client of the travel management system (TMS) of the invention can transparently make travel bookings using more than one CRS (GDSs and direct connect CRSs) for different travel item segments (e.g. air, car, and hotel) to thereby choose the best travel item for themselves. This sort of booking, even though it uses multiple CRSs, is indistinguishable from a regular booking using a standard GDS.

Typically, the super PNR TMS server 100 is a high-end server computer but can be any type of computer system that includes circuitry capable of processing data (e.g. a personal computer, workstation, minicomputer, mainframe, network computer, laptop, desktop, etc.). For example, embodiments of the invention can be generally implemented in the super PNR TMS server 100 that includes a processor that processes information in order to implement the functions of the super PNR TMS server. As illustrative examples, the "processor" may include a central processing unit having any type of architecture, a digital signal processor, a microcontroller, or a state machine. Typically, the processor is coupled to a memory. The memory can be non-volatile or volatile memory, or any other type of memory, or any combination thereof. Examples of non-volatile memory include flash memory, Read-only-Memory (ROM), a hard disk, a floppy drive, an optical digital storage device, a magneto-electrical storage device, Digital Video Disk (DVD), Compact Disk (CD), and the like whereas volatile memory includes random access memory (RAM), dynamic random access memory (DRAM) or static random access memory (SRAM), and the like.

The system and method for travel management for making travel related bookings according to embodiments of the present invention can be implemented as one or more instructions (e.g. code segments) to perform the desired functions of allowing a client to make travel bookings from the plurality of CRSs 310 for different travel item segments (e.g. air, car, and hotel) such that the client can choose and book the best travel item segment from any one of the accessible CRSs, modify a super PNR booking record representing the client's booked itinerary, as well as the many other functions (as will be discussed in greater detail later). The instructions which when read and executed by a processor, cause the processor to perform the operations necessary to implement and/or use embodiments of the invention. Generally, the instructions are tangibly embodied in and/or readable from a machine-readable medium, device, or carrier, such as memory, data storage devices, and/or a remote device contained within or coupled to the super PNR TMS server 100. The instructions may be loaded from memory, data storage devices, and/or remote devices into the memory of the super PNR TMS server 100 for use during operations.

Figure 4:
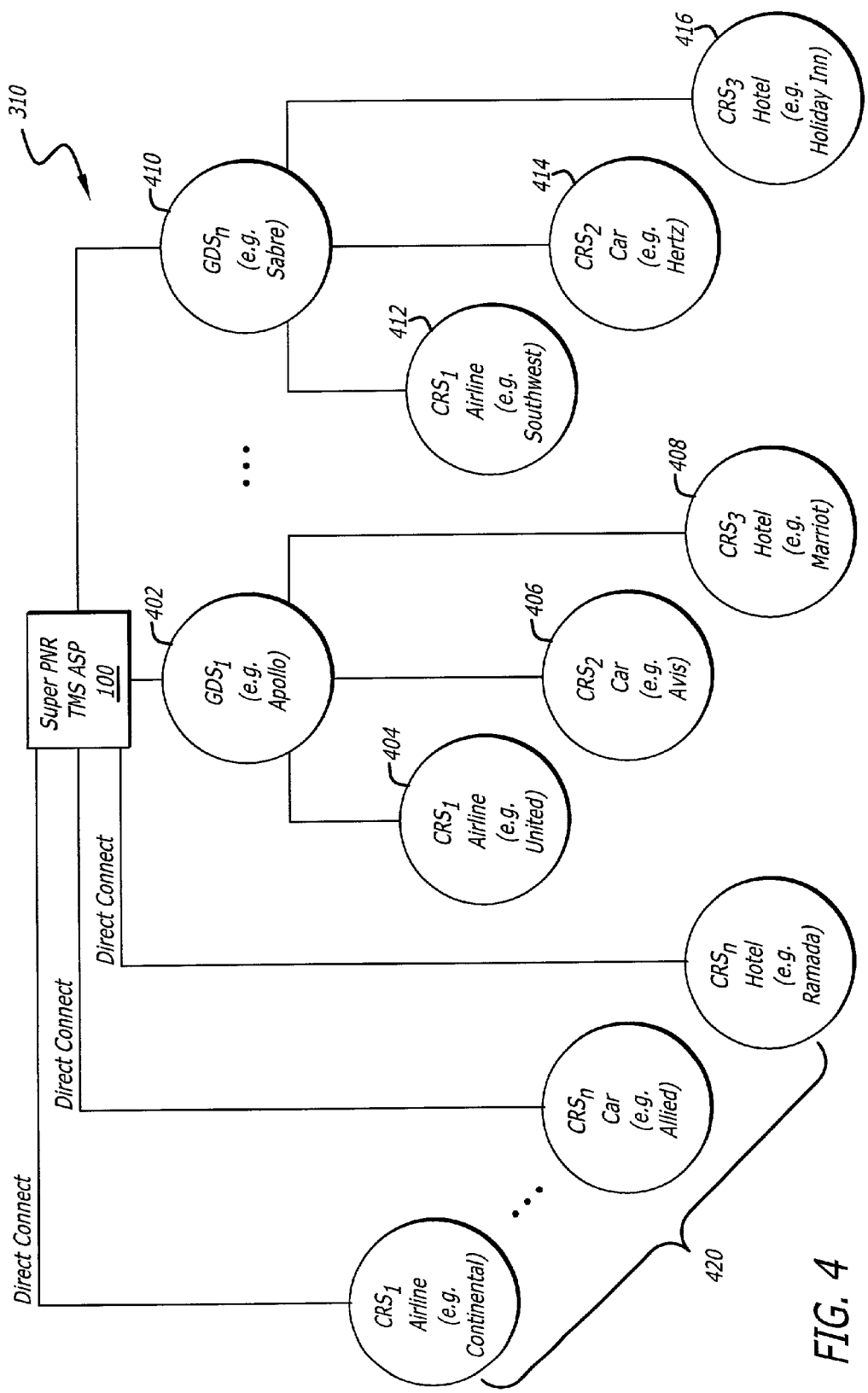
FIG. 4 illustrates an exemplary set of communication reservation systems (CRSs) with which embodiments of the present invention can be practiced.

Turning briefly to FIG. 4, FIG. 4 illustrates an exemplary set of communication reservation systems (CRSs) with which embodiments of the present invention can be practiced. As previously discussed, the super PNR TMS server 100 allows the client access to multiple CRS networks 310 for making travel related bookings. CRSs generally include global distribution systems (GDSs) and direct connect CRSs. A GDS is a set of internally network databases, and the business logic that ties them together, for the primary purpose of managing the sale of airline, car rental, and hotel inventories. Today's GDSs include APOLLO, SABRE, WORLDSPAN, AMADEUS, and many others. A GDS is connected to a number of independent CRSs with which the GDS has a business relationship. On the other hand, many CRSs can now be connected to directly, to make bookings without going through a GDS, and are thus termed direct connect CRSs.

As shown in FIG. 4 the super PNR TMS server 100 can be connected to multiple GDSs, e.g. $GDS_1$ through $GDS_n$ for making travel related bookings. As illustrated in this example, the super PNR TMS server 100 can be coupled to $GDS_1$ 402 (e.g. APOLLO) and $GDS_n$ 410 (e.g. SABRE). For example, $GDS_1$ 402 (e.g. APOLLO) may be connected to a $CRS_1$ 404 for airline travel items (e.g. UNITED), a $CRS_2$ 406 for rental car travel items (e.g. AVIS), and a $CRS_3$ 408 for hotel travel items (e.g. MARRIOT). Continuing with the present example, the super PNR TMS server 100 can also be coupled to $GDS_n$ 410 (e.g. SABRE) which maybe connected to a $CRS_1$ 412 for airline travel items (e.g. SOUTHWEST AIRLINES), a $CRS_2$ 414 for rental car travel items (e.g. HERTZ), and a $CRS_3$ 416 for hotel travel items (e.g. HOLIDAY INN. Furthermore, the super PNR TMS server 100 can also be connected to multiple direct connect CRSs, e.g. $CRS_1$ through $CRS_n$ 420, for making travel related bookings. For example, the super PNR TMS server 100 may be connect to a direct connect $CRS_1$ for airline travel items (e.g. CONTINENTAL AIRLINES), direct connect $CRS_2$ for car travel items (e.g. ALLIED), and direct connect $CRS_n$ for hotel items (e.g. RAMADA), along with many others. As should be appreciated, this is only an illustrative example and that the super PNR TMS server 100 can be connected to any number of GDSs and direct connect CRSs. Advantageously, with the super PNR TMS server 100 being connected multiple GDSs and direct connect CRSs, a client of the super PNR TMS server 100 of the invention can transparently make travel bookings using more than one CRS (GDSs and direct connect CRSs) for different travel item segments (e.g. air, car, and hotel) to thereby choose the best travel item to suit their needs (e.g. based on price, corporate relationship with certain vendors, etc.).

Returning briefly to FIG. 3, the Terminal Access Editor (TAE) 304 is used to define and store predefined selections of CRSs (GDSs and direct connect CRSs) to be accessed during the travel booking request of a client. Prior to a travel booking request, particular CRSs for particular travel item segments (e.g. air, car, and hotel) are predefined for the client, along with particular conditions, utilizing the TAE 304. Typically, when a client first decides to adopt using the super PNR TMS server 100 for their travel item bookings, they must first define which CRSs they wish to use, for which particular travel items segments, and under what conditions. For example, Company A may want to use the super PNR TMS server 100 only for airline reservations as follows: UNITED for airline reservations (e.g. via the APOLLO GDS) but if that is unavailable check SOUTHWEST (e.g. via the SABRE GDS). Alternatively, Company B may want to check both UNITED (e.g. via the APOLLO GDS) and SOUTHWEST (e.g. via the SABRE GDS) for the lowest cost airline reservations, want to check HERTZ for car rentals (e.g. via the SABRE GDS) but if that is unavailable check AVIS (e.g. via the APOLLO GDS), and use RAMADA only for hotel reservations (e.g. via Direct Connect CRS to RAMADA).

In order to accomplish this, a super PNR TMS server 100 site implementation consultant programs these predefined CRSs and conditions into the super PNR TMS server 100 for the client via the TAE 304. These predefined CRSs and conditions for the client can be stored in the database 110. When the client logs on to the super PNR TMS server 100, and super PNR is enabled, these predefined CRSs and conditions are available to the booking engine 302. The booking engine 302 reads the database 110 to determine and set the predefined CRSs for the client and accesses the predefined CRSs from the network of CRSs 310 to check the availability of travel items for the client.

Turning now to FIG. 5, FIG. 5 illustrates data 500 used by a terminal access editor (TAE) according to one embodiment of the present invention. As shown in FIG. 5, the terminal access editor (TAE) 304 can be programmed by the site implementation consultant with TAE data 500 for a client, as will be discussed. It should be appreciated that this is only one example. Many other types of data could be used implement the functionality of the TAE as previously discussed, to define the CRSs a client wishes to use, for particular travel items segments, and under what conditions. The TAE displays multiple sets of text entry and selection fields plus a submit button to save the form's field values. Each field set comprises a singe unique TAE string entry. These entries allow the site implementation consultant to configure the super PNR TMS server site for a particular client. The TAE data that sets up the predefined CRSs and conditions for the individual client is then stored in the database 110 such that each client of the super PNR TMS server has a unique configuration.

For example, data 500 includes a request type 502. The request type 502 can be a selection field pre-populated with the following values: all, air availability, car availability, hotel availability, and low fare search. "All" is the default setting. Selection of this setting configures the super PNR TMS server 100 to access the secondary CRSs (along with the default or primary CRS) when performing any availability inquiries (e.g. for air, car, and hotel). Selection of the air availability setting configures the super PNR TMS server to access the secondary CRSs (along with the default or primary CRS) when performing availability inquiries for airline reservations. Selection of the car availability setting configures the super PNR TMS server to access the secondary CRSs (along with the default or primary CRS) when performing availability inquiries for car rentals. Selection of the hotel availability setting configures the super PNR TMS server to access the secondary CRSs (along with the default or primary CRS) when performing availability inquiries for hotels. Selection of the low fare search configures the super PNR TMS server to access the secondary CRSs (along with the default or primary CRS) when performing a low air fare search such that the lowest air fare from the secondary CRSs that have been searched is found. The low fare search can also be configured such that the super PNR TMS server accesses secondary CRSs to perform lowest cost searches for car rentals and hotel availabilities.

The TAE also has a CRS selection field pre-populated with the system names of each CRS participant (e.g. the GDSs and direct connect CRSs) supported by the super PNR TMS server, each of which can be predefined by the site implementation consultant for use by a client. The super PNR TMS server's host CRS is usually the default CRS 506. Typically, this is a GDS (e.g. APOLLO) that provides access to associated vendors (e.g. air, car, hotel) when searching for the availability of travel items for the client. Alternatively, a primary CRS 510 (different from the default CRS) can be defined for a client. Typically, this is another GDS (e.g. SABRE) that provides access to other associated vendors (e.g. air, car, hotel). However, it should be appreciated that direct connect CRSs could be used as the primary or default CRS. Moreover, many secondary CRSs (e.g. other GDSs and other direct connect CRSs), shown as secondary$_1$ CRS 514 through secondary$_n$ CRS 518, may be selected for the client that can be searched through when checking for the availability of travel items for the client to provide the client with a greater variety of travel item segments (e.g. air, car, and hotel) to select from.

The TAE further includes TA (terminal access) group text entry fields that enable the input of a specific terminal access address for the default, primary, and secondary CRSs, respectively. The terminal access address is an internal code used by the super PNR TMS server to identify each particular CRS for each particular client and to help connect to each particular CRS for each particular client. A default TA group 508, a primary TA group 516, and secondary TA group's 516 and 520, respectively, are shown in FIG. 5.

The TAE includes a group type selection field that is pre-populated with primary and secondary field values shown as group type data 504. Setting the value of the field to primary configures the super PNR TMS server to use the primary CRS instead of the default CRS. On the other hand, setting the value to the field of secondary configures the super PNR TMS server to use the secondary CRSs in addition to the default CRS. Secondary CRSs can be used in conjunction with the primary CRS by selecting the appropriate condition setting, as will be discussed.

The TAE also has a condition selection field pre-populated with certain values to determine when the super PNR TMS server will use information gathered from the secondary CRSs, shown as condition data 524 in FIG. 5. The condition selection field includes an: active setting, a use if availability list is empty setting, a check availability only for given vendors setting, and an inactive setting. The active setting is the default setting. When the "active setting" is selected, availability data for travel items from secondary CRSs is merged with the availability data for travel items from the primary or default CRS (whichever is being used). It should be noted that duplicate availability data for travel items (e.g. from different CRSs) is filtered. When the "use if availability list is empty setting" is selected, availability data for travel items from the secondary CRSs is displayed only if the primary CRS or default CRS fails to return any availability data for the travel items. When the "check availability only for given vendors setting" is selected, only availability data for travel items from each secondary CRS for the vendors entered into the vendor field (shown as vendor data 528) is displayed. When the "inactive setting" (not shown) is selected, the availability data for travel items for the entry is not shown. This ensures that the data for this entry is not lost and can be used in the future. It should be appreciated that this and many other types of data could be used to implement the functionality of the TAE as previously discussed, to define the CRSs a client wishes to use, for which particular travel items segments, and under what conditions.

Some illustrative examples will now be presented for particular predefined client configurations that are set up to utilize particular CRSs for different types of travel item (e.g. air, car, hotel) searches, under certain conditions, utilizing the TAE 304, as previously discussed. For example, Company A may want to use the super PNR TMS server 100 to book certain travel item segments and will have the TAE set to the following values: Request type 502 set to all; Group type 504 set to secondary; default GDS 506 set to APOLLO; Secondary GDS 514 set to SABRE; and condition 524 set to active. Thus, when company A does an availability search, travel items for air, car, and hotels retrieved from both the APOLLO GDS and the SABRE GDS will be merged together for selection by the client. For example, referring also to FIG. 4 for illustrative purposes, airline data from, e.g. UNITED AIRLINES from the APOLLO GDS will be displayed to the client along with airline data from, e.g. SOUTHWEST AIRLINE from the SABRE GDS such that the client can choose the flight to best suit their needs. Continuing with the current example, car and hotel data from, e.g. AVIS and MARRIOT, respectively, from the APOLLO GDS will be displayed to the client along with car and hotel data from, e.g. HERTZ and HOLIDAY INN, respectively, from the SABRE GDS, such that the client can choose the best car rental and hotel. The client can then book the air, car, and hotel travel items from these GDSs to best suit their needs.

Alternatively, in the above example, if the condition 524 is set to "use if availability list is empty setting," the availability data for the air, car, or hotel travel item, respectively, from the secondary GDS set to SABRE will be displayed only if the default APOLLO GDS fails to return any availability data for the respective air, car, or hotel travel item.

In another example, Company B may want to use the super PNR TMS server to book certain travel item segments and will have the TAE set to the following values: Request type 502 set to Air; Group type 504 set to primary; primary GDS 510 set to APOLLO; Secondary direct connect CRS 514 set to CONTINENTAL; and condition 524 set to active. Thus, when company B does an availability search, travel items for air only will be retrieved from both the APOLLO GDS and the CONTINENTAL direct connect CRS 514 and will be merged together for selection from the client. For example, airline data from, e.g. UNITED AIRLINES from the APOLLO GDS will be displayed to the client along with airline data from, e.g. CONTINENTAL AIRLINES from the CONTINENTAL direct connect CRS, such that the client can choose the flight to best suit their needs. The client can then book best airline travel item to suit their needs. Alternatively, the request type 502 can be set to low fare search such that only the airline with the lowest cost flight is shown. The client can then book this retrieved lowest cost airline flight.

In yet another example, Company C may want to use the super PNR TMS server to book certain travel item segments and will have the TAE set to the following values: Request type 502 set to Car; Group type 504 set to secondary; default GDS 506 set to APOLLO; Secondary GDS 514 set to SABRE; condition 524 set to vendor; and vendor 528 set to HERTZ. Thus, when company C does an availability search, travel items for car rentals only will be retrieved from both the APOLLO GDS and the SABRE GDS and will be merged together for selection from the client. For example, car data from, e.g. AVIS from the APOLLO GDS will be displayed to the client along with car data only from the HERTZ vendor (other car data from other car vendors of SABRE will not displayed) from the SABRE GDS, such that the client can choose the best car rental. The client can then book the best car rental to suit their needs.

It should be appreciated that the above examples are for purely illustrative purposes to show the functionality of the invention.

The super PNR TMS server system 100 of the invention includes software, information processing hardware, and various processing steps, which will be described below. The features and process steps of the present invention may be embodied in machine or computer executable instructions embodied within a machine-readable media. The instructions can be used to cause a general purpose or special purpose processor, which is programmed with the instructions to perform the steps of the present invention. Alternatively, the features or steps of the present invention may be performed by specific hardware components that contain hard-wired logic for performing the steps, or by any combination of programmed computer components and custom hardware components. While, embodiments of the present invention will be described with reference to the World-Wide Web, the method, system, and apparatus described herein is equally applicable to other network infrastructures or other data communications systems.

Those skilled in the art will recognize that the exemplary environments illustrated in FIGS. 1-5 are not intended to limit the present invention. Indeed, those skilled in the art will recognize that other alternative system environments, client devices, and servers may be used without departing from the scope of the present invention. Furthermore, while aspects of the invention and various functional components have been described in particular embodiments, it should be appreciated these aspects and functionalities can be implemented in hardware, software, firmware, middleware or a combination thereof. Various methods, processes, procedures and/or algorithms will now be discussed to implement certain aspects of the invention.

Figure 6:
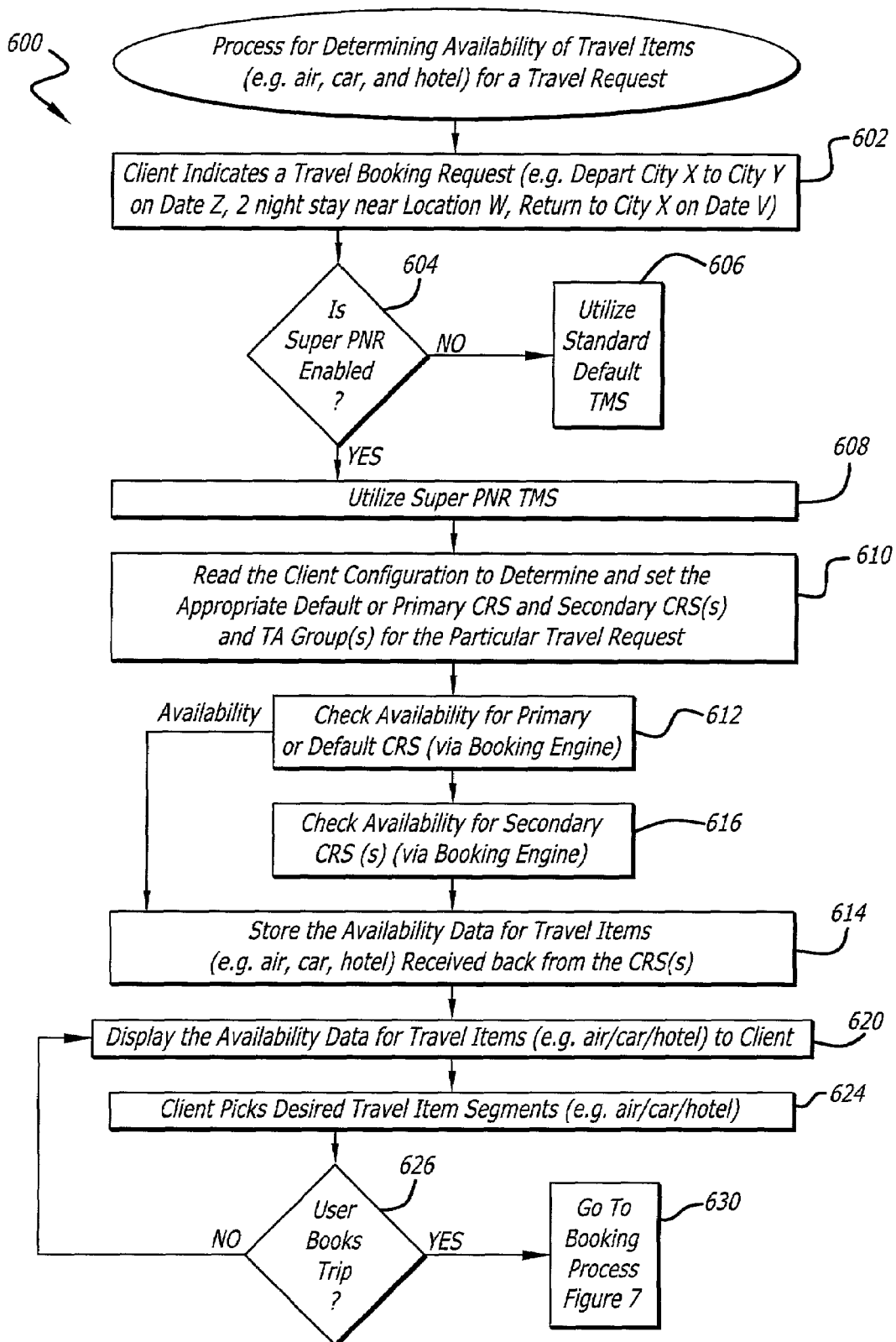
FIG. 6 is a flowchart illustrating a process for determining the availability of travel items (e.g. air, car, and hotel) for a travel booking request according to one embodiment of the present invention.

Referring now to FIG. 6, FIG. 6 is a flowchart illustrating a process 600 for determining the availability of travel items (e.g. air, car, and hotel) for a travel booking request according to one embodiment of the present invention. At block 602, a client initiates a travel booking request. For example, a client, via the client interface, may inquire about travel items (e.g. air fare, car rental, and hotel) for a trip departing from city X (e.g. San Jose) and arriving at city Y (e.g. Los Angeles) on date Z, with a two night stay in Los Angeles near location W (e.g. Los Angeles airport) and returning to San Jose on date V. The process 600 next determines whether super PNR functionality is enabled (decision block 604). For example, a client could enable super PNR via the client interface or super PNR could be automatically enabled for the client via the process 600 (e.g. the client's configuration stored in the database is set for super PNR). If super PNR is not enabled, the standard default travel management systems are utilized. However, if super PNR is enabled then the super PNR travel management system (TMS) is utilized (block 608) (e.g. via the super PNR TMS server).

Next, the process 600 reads the client configuration to determine and set the appropriate default or primary CRS and secondary CRSs and TA groups, as well as other conditions, for the particular travel request (block 610). As previously discussed, in one embodiment, a default or primary CRS and secondary CRSs for particular travel items segments can be predefined for the client, along with other conditions, (e.g. via the terminal access editor (TAE)) and the configuration stored in a database for use whenever a client utilizes the super PNR TMS to make a travel booking request.

The process 600 then accesses the primary or default CRS to check the availability of the requested travel items (block 612). For example, this can be done utilizing a booking engine. If travel items are available (e.g. air fare, car rental, and hotel) that meet the client's trip description, the availability data for the travel items received back from the primary or default CRS is stored (block 614). Next, the process 600 then accesses the secondary CRSs to check the availability of the requested travel items (e.g. utilizing a booking engine) (block 616). If travel items are available (e.g. air fare, car rental, and hotel) that meet the client's trip description, the availability data for the travel items received back from the secondary CRSs is stored (block 614). This information is then used in the booking process to be discussed. The availability data for the travel items (e.g. air fare, car rental, and hotel) is then displayed to the client (block 620). Next, the process 600 permits the client to pick the desired travel items segments (e.g. air, car, hotel) (block 624). After the client picks of the desired travel items segments, the process 600 allows the user to book the trip (block 626). In one embodiment, the display, selection, and booking of the desired travel items by the client can be accomplished utilizing a client interface which causes the display of these items at the client device via a Web/Browser type interface. If the client books the trip, the process 600 proceeds to the booking process of FIG. 7 (block 630). Otherwise, the process redisplays the availability data at block 620.

Figure 7:
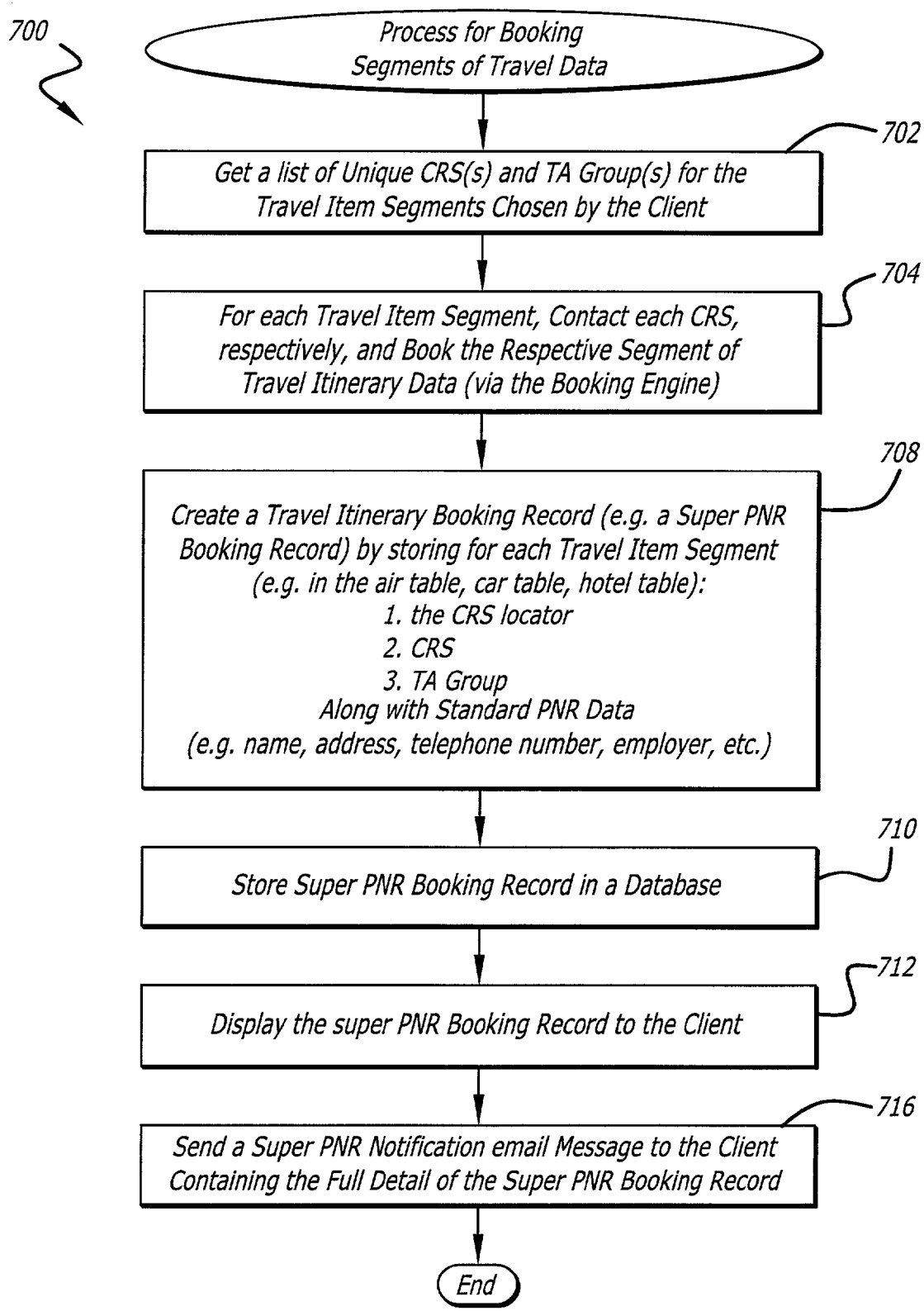
FIG. 7 is a flowchart illustrating a process for booking travel item segments according to one embodiment of the present invention.

Referring to FIG. 7, FIG. 7 is a flowchart illustrating a process 700 for booking travel item segments (e.g. air, car, hotel) according to one embodiment of the present invention. At block 702, the process 700 gets the list of unique CRSs and TA groups for the travel item segments chosen by the client. Next, for each travel item segment, the process 700 contacts each CRS, respectively, and books the respective segment (e.g. air segment, car segment, hotel segment) of the travel itinerary data with the respective CRS (block 704). This can be accomplished utilizing the booking engine. The process 700 then creates a travel itinerary booking record, or more particularly the super PNR booking record, by storing for each travel item segment (e.g. in an air table, car table, hotel table, respectively): 1. The CRS locator; 2. The CRS; 3. The TA group; along with other standard PNR data (e.g. name, address, telephone number, employer, etc.) (block 708).

The process 700 then stores the super PNR booking record in a database (block 710). The super PNR booking record can then be displayed to the client to allow the client to create, change, or cancel booked travel item segments, even though they are through different CRSs (e.g. via the client interface) (block 712). The client interface can cause the display of these items at the client device via a Web/Browser type interface. Next, the process 700 sends a super PNR notification e-mail message to the client device containing the full detail of the super PNR booking record (block 716).

Referring now to FIG. 8, FIG. 8 illustrates data 800 used in a super PNR booking record according to one of embodiment of the present invention. The super PNR data 800 includes PNR data 802 such as the name of the traveler (i.e. the person for whom the booking is being made) 804, the address of the traveler 806, the telephone number of the traveler 808, the employer of the traveler 810, and a PNR record locater 811, along with other standard PNR data. Further, super PNR data 800 includes data related to an air segment 820, a car segment 830, and hotel segment 840. It should be appreciated that any number of air, car, and hotel segments can be included in the super PNR data, as well as, other segments related to other types of travel data and non-travel data.

For example, the air segment data 820 can include the name of the airline 822, the date and time of the flight 824, super PNR data related to the CRS 826, super PNR data related to the TA group 828, super PNR data related to the CRS locator 829, and other types of standard PNR data. Similarly, the car segment data 830 can include the name of the car rental company 832, the day(s) of the car rental 834, super PNR data related to the CRS 836, super PNR data related to the TA group 838, super PNR data related to the CRS locator 839, and other types of standard PNR data. The hotel segment 840 can include the name of the hotel 842, the days of the hotel booking 844, super PNR data related to the CRS 846, super PNR data related to the TA group 848, super PNR data related to the CRS locator 849 and other standard PNR data. It should be appreciated that this is only one example of the types of data that can be included in a super PNR data booking record and that many other types of data can also be included. The super PNR data can be stored in a database, for example, an Oracle database. Further, the super PNR data can be displayed in a multitude of different formats to the client at the client device.

As previously discussed, the super PNR booking record can be displayed to the client at the client device to allow the client to create, change, or cancel booked travel item segments, even though they are through different CRSs, via the client interface. The client interface can cause the display of these items at the client device via a Web/Browser type interface. In one embodiment, the super PNR system includes an Agency super PNR Travel Inquiry page selectable by the client that allows the client to review, modify, or cancel any active super PNR booking record for their travelers. Super PNR booking records can be searched for by the PNR locator 811. If the PNR locator is found, the super PNR booking record is returned to the client pre-populated with the traveler's booking information. Further, super PNR booking records can be searched for by either the first name, last name, or both, of the traveler. If the name is found, the super PNR booking record is returned to the client pre-populated with the traveler's booking information. When booking changes or cancellations are made for a traveler, the super PNR booking record accurately reflects these changes, even though they are through different CRSs. It should be appreciated that changes to bookings are made in substantially the same way as new bookings are made, as previously discussed.

Thus, a client (e.g. a travel agency) using the travel management system (TMS) of the invention can transparently make travel bookings using more than one CRS (GDSs and direct connect CRSs) for different travel item segments (e.g. air, car, and hotel) to thereby choose the best travel item to suit their traveler's needs and can easily make changes to these bookings. This sort of initial booking and subsequent changes to the booking, even though they are through multiple CRSs, is indistinguishable from a regular booking using a standard GDS. Moreover, the client can utilize the TMS of the invention to create, change, or cancel booked travel item segments all at one location—e.g. at the server implementing the TMS via a Web-site interface, and when booking changes or cancellations are made for a traveler, the super PNR booking record accurately reflects these changes, even though they are through different CRSs. Accordingly, clients are much more likely to utilize the travel management system (TMS) of the invention, as opposed to trying make changes at different CRSs and never being sure if they have an accurate booking record. Furthermore, travel agencies that utilize the TMS of the invention can utilize less technical employees in favor of those with higher customer technical skills.

While the present invention and its various functional components been described in particular embodiments, it should be appreciated the present invention can be implemented in hardware, software, firmware, middleware or a combination thereof and utilized in systems, subsystems, components, or subcomponents thereof. When implemented in software, the elements of the present invention are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.). Examples of the machine/processor-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A travel management system (TMS) for making travel related bookings, the TMS comprising:
    a server to provide access to a plurality of computer reservation systems (CRSs) for a client initiating a travel booking request;
    a booking engine to allow the client to book at least one travel item segment from any one of the accessible CRSs, wherein the booking engine generates a super passenger name record (PNR) including information associated with at least one booked travel item segment and information identifying each CRS for a respective booked travel item segment; and
    a terminal access editor (TAE) to define a selection of the plurality of CRSs for the client to be stored in a database and accessed during the travel booking request for the client.

2. The travel management system of claim 1, wherein the booking engine:
    reads the database to determine the selected plurality of CRSs to be accessed during the travel booking request; and
    accesses the selected plurality of CRSs to check the availability of travel items at the CRSs for the travel booking request.

3. The travel management system of claim 2, wherein the selection of the plurality of CRSs includes a default CRS or a primary CRS and at least one secondary CRS.

4. The travel management system of claim 2, further comprising a client interface to:
    display available travel items accessed from the selected plurality of CRSs for the travel booking request at the client; and
    allow the client to select a desired travel item.

5. The travel management system of claim 4, wherein for each selected travel item, the booking engine books the selected item with the respective CRS.

6. The travel management system of claim 4, wherein only the lowest cost travel item accessed from the selected plurality of CRSs is displayed.

* * * * *